US011891698B2

(12) United States Patent
Okuda et al.

(10) Patent No.: US 11,891,698 B2
(45) **Date of Patent: *Feb. 6, 2024**

(54) TURBULENCE-REDUCING DEVICE FOR STIRRING A SURFACE TREATMENT SOLUTION

(71) Applicant: C. Uyemura & Co., Ltd., Osaka (JP)

(72) Inventors: Tomoji Okuda, Osaka (JP); Daisuke Matsuyama, Osaka (JP); Masayuki Kiso, Osaka (JP); Daisuke Hashimoto, Osaka (JP); Akira Okada, Osaka (JP); Keita Taniguchi, Osaka (JP)

(73) Assignee: C. Uyemura & Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,256

(22) Filed: Oct. 5, 2020

(65) Prior Publication Data

US 2021/0102295 A1 Apr. 8, 2021

(30) Foreign Application Priority Data

Oct. 7, 2019 (JP) ................................ 2019-184437

(51) Int. Cl.

| | |
|---|---|
| ***C23C 18/16*** | (2006.01) |
| ***B05C 3/04*** | (2006.01) |
| ***B01F 35/32*** | (2022.01) |
| ***B01F 31/44*** | (2022.01) |
| ***C25D 21/10*** | (2006.01) |
| ***B05C 3/02*** | (2006.01) |
| ***C25D 17/00*** | (2006.01) |
| ***C25D 17/02*** | (2006.01) |

(52) U.S. Cl.
CPC ........ *C23C 18/1628* (2013.01); *B01F 35/325* (2022.01); *B05C 3/02* (2013.01); *B05C 3/04* (2013.01); *C23C 18/1683* (2013.01); *C25D 17/00* (2013.01); *C25D 17/02* (2013.01); *C25D 21/10* (2013.01)

(58) Field of Classification Search
CPC ............................ B01F 31/449; B01F 35/325
USPC ................................................ 366/332–335
See application file for complete search history.

(56) References Cited

U.S. PATENT DOCUMENTS

| | | | | |
|---|---|---|---|---|
| 3,912,237 A * | 10/1975 | Ostberg et al. ....... | B01F 31/441 259/112 |
| RE45,687 E * | 9/2015 | Saito ...................... | C25D 21/10 |
| 11,173,513 B2 * | 11/2021 | Okuda ...................... | B05C 3/04 |
| 2004/0262150 A1 * | 12/2004 | Yajima .................. | C25D 21/12 204/224 R |

(Continued)

FOREIGN PATENT DOCUMENTS

JP 4365143 B2 11/2009

*Primary Examiner* — Karl Kurple
(74) *Attorney, Agent, or Firm* — David R. Stevens; Stevens Law Group

(57) ABSTRACT

A surface treatment device includes at least one paddle in a plate shape, in a surface treatment tank, for stirring a surface treatment solution near a substrate by reciprocally moving the paddle with respect to the substrate. The paddle is configured by integrally forming multiple square bars provided in a depth direction or a horizontal direction of the surface treatment solution at regular intervals along the substrate. A liquid draining member for draining a liquid is arranged in at least one side of an end of the paddle.

6 Claims, 11 Drawing Sheets

(56) References Cited

U.S. PATENT DOCUMENTS

| | | | | | |
|---|---|---|---|---|---|
| 2009/0139871 | A1* | 6/2009 | Saito | C25D 21/10 | 205/148 |
| 2009/0218231 | A1* | 9/2009 | Yajima | C25D 21/12 | 205/96 |
| 2010/0149908 | A1* | 6/2010 | Singh | B01F 11/00 | 366/276 |
| 2010/0176088 | A1* | 7/2010 | Dunnebeil | H05K 3/0085 | 216/83 |
| 2010/0212694 | A1* | 8/2010 | Keigler | C25D 7/123 | 134/18 |
| 2011/0073482 | A1* | 3/2011 | Kuriyama | C23C 18/1628 | 205/125 |
| 2012/0152749 | A1* | 6/2012 | Yasuda | C25D 5/18 | 205/96 |
| 2018/0221835 | A1* | 8/2018 | Masuda | B01F 11/0082 | |
| 2019/0271095 | A1* | 9/2019 | Kimura | C25D 21/12 | |

* cited by examiner

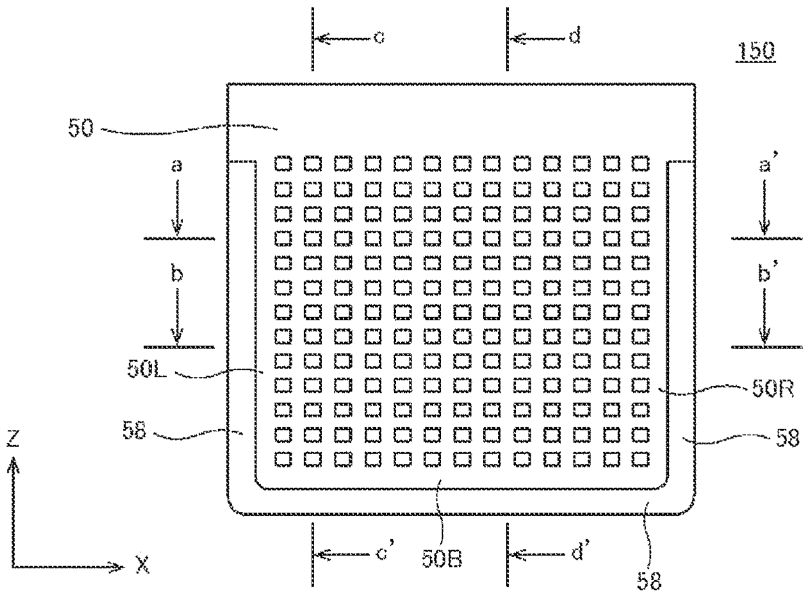
FIG.11
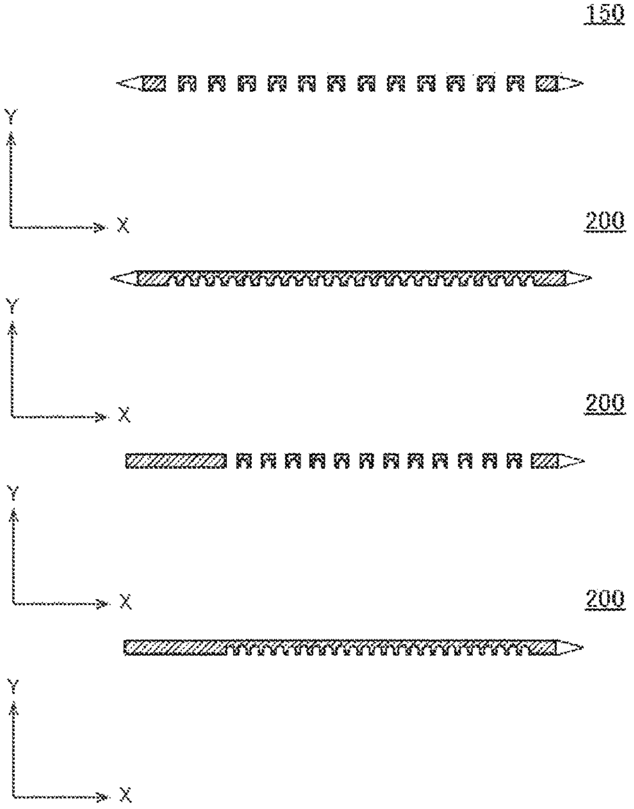
FIG.12 A
FIG.12 B
FIG.12 C
FIG.12 D

TURBULENCE-REDUCING DEVICE FOR STIRRING A SURFACE TREATMENT SOLUTION

BACKGROUND OF THE INVENTION

Field of the Invention

The present invention relates to a surface treatment device comprising a paddle for stirring a surface treatment solution, a surface treatment method using a paddle for stirring a surface treatment solution, and a paddle for stirring a surface treatment solution. The present application claims priority based on Japanese Patent Application No. 2019-184437 filed in Japan on Oct. 7, 2019, which is incorporated by reference herein.

Description of Related Art

In the past, a plating solution and a surface treatment solution such as a pre-treatment solution or a post-treatment solution for plating were stirred, in order to perform a plating or a surface treatment before and after the plating efficiently.

By stirring a plating solution and a surface treatment solution before and after a plating, it is possible to uniformize a plating thickness of an object to be plated.

For example, in Patent Literature 1, a plating solution is stirred by using a fin made of an elastic material in a plate shape facing a direction of a surface to be plated, and by bending the fin in an inverse direction with respect to respective moving direction of a paddle at the time of a reciprocal movement, and by making a flow of the plating solution along the bent fin to be a flow toward a proximity of the surface to be plated.

Patent Literature 1: JP 4365143 B

SUMMARY OF THE INVENTION

However, by conventional method as indicated in FIG. 1 of Patent Literature 1, only an upper part of a paddle 34 is mounted to a paddle shaft 32, and the fin and the paddle are being independent, so a part of a surface treatment solution will be stirred strongly and a part of the surface treatment solution will be stirred weakly, so it cannot be stirred uniformly, and a plating thickness will not be uniform. Further, according to a way of stirring, there is a case that a turbulent flow is generated in the surface treatment solution, and there is also a problem on a strength of the device.

Here, the purpose of the present invention is to provide a surface treatment device and a paddle with improved strength and uniform plating thickness by uniformly stirring a surface treatment solution near a substrate. In addition, the purpose of the present invention is to provide a surface treatment method capable of stirring for a long period of time, by uniformizing a plating thickness, and by improving a strength of a paddle. Further, the purpose of the present invention is to provide a surface treatment device, a surface treatment method, and a paddle capable of decreasing a generation of a turbulent flow in the surface treatment solution.

A surface treatment device relating to one embodiment of the present invention is a surface treatment device comprising at least one paddle in a plate shape, in a surface treatment tank, for stirring a surface treatment solution near a substrate by reciprocally moving the paddle with respect to the substrate, wherein the paddle is configured by integrally forming a plurality of square bars provided in a depth direction or a horizontal direction of the surface treatment solution at regular intervals along the substrate, and a liquid draining member for draining a liquid is arranged in at least one side of an end of the paddle.

In this way, it is possible to provide the surface treatment device with improved strength and uniform plating thickness by uniformly stirring a surface treatment solution near a substrate. Further, it is possible to provide the surface treatment device capable of decreasing a generation of a turbulent flow in the surface treatment solution.

At this time, in one embodiment of the present invention, a shape of the liquid draining member may be a tapered shape or a circular shape in a cross section in a thickness direction of the liquid draining member.

In this way, it is possible to decrease a turbulent flow of the surface treatment solution further.

In addition, in one embodiment of the present invention, a square bar of the plurality of square bars is provided with a curved surface with respect to the substrate in a cross section in a thickness direction of the square bar, and the curved surface may be provided alternately facing left and facing right with respect to the substrate.

In this way, it is possible to stir more uniformly by being able to capture the surface treatment solution with respect to both moving directions when reciprocally moving the paddle.

In addition, in one embodiment of the present invention, the regular intervals may be formed in a distance of 10 to 30 mm.

In this way, it is possible to uniformize a plating thickness more by stirring the surface treatment solution uniformly without shielding the substrate.

In addition, in one embodiment of the present invention, the square bar may comprise a side of 5 to 10 mm in length.

In this way, it is possible to improve a strength and to uniformize a plating thickness by stirring the surface treatment solution more uniformly, as it will be an optimum size for stirring the surface treatment solution.

In addition, in one embodiment of the present invention, the curved surface may comprise a radius of 3 to 10 mm.

In this way, it is possible to improve a strength and to uniformize a plating thickness by stirring the surface treatment solution more uniformly by capturing the surface treatment solution more efficiently, as it will be an optimum curved surface of the paddle.

In addition, in one embodiment of the present invention, a distance between the paddle and the substrate may be 10 to 30 mm.

In this way, a concern of the paddle contacting the substrate will be decreased. In addition, it is possible to prevent a decrease of a stirring force.

In addition, in one embodiment of the present invention, it may further comprise a powering means for reciprocally moving the paddle with a stroke of 50 to 200 mm, and with a moving speed of 35 to 600 mm/s.

In this way, it is possible to improve a strength and to uniformize a plating thickness by stirring the surface treatment solution more uniformly, as it will be optimum stroke and moving speed for stirring the surface treatment solution.

In addition, in one embodiment of the present invention, the paddle may be arranged at both sides of the substrate.

In this way, it is possible to uniformize a plating thickness at front and back surfaces of the substrate, by stirring the surface treatment solution uniformly at the front and back surfaces of the substrate.

In addition, other embodiment of the present invention is a surface treatment method using at least one paddle in a plate shape for stirring a surface treatment solution near an a substrate by reciprocally moving the paddle with respect to the substrate, wherein the paddle is configured by integrally forming a plurality of square bars provided in a depth direction or a horizontal direction of the surface treatment solution at regular intervals along the substrate, and in at least one side of an end of the paddle, a liquid draining member for draining a liquid is arranged.

In this way, it is possible to provide the surface treatment method capable of stirring for a long period of time, by uniformizing a plating thickness by uniformly stirring the surface treatment solution near the substrate, and by improving a strength of the paddle. Further, it is possible to provide the surface treatment method capable of decreasing a generation of a turbulent flow in the surface treatment solution.

In addition, other embodiment of the present invention is a paddle in a plate shape for stirring a surface treatment solution near an a substrate by reciprocally moving the paddle with respect to the substrate, wherein the paddle is configured by integrally forming a plurality of square bars provided in one direction at regular intervals along the substrate, and a liquid draining member for draining a liquid is arranged in at least one side of an end of the paddle.

In this way, it is possible to provide the paddle capable of improving a strength and uniformizing a plating thickness by uniformly stirring the surface treatment solution near the substrate. Further, it is possible to provide the paddle capable of decreasing a generation of a turbulent flow in the surface treatment solution.

As explained in the above, according to the present invention, it is possible to provide the surface treatment device and the paddle with improved strength and uniform plating thickness by uniformly stirring the surface treatment solution near the substrate. In addition, it is possible to provide the surface treatment method capable of stirring for a long period of time, by uniformizing a plating thickness, and by improving a strength of the paddle. Further, it is possible to provide the surface treatment device, the surface treatment method, and the paddle capable of decreasing a generation of a turbulent flow in the surface treatment solution..

BRIEF DESCRIPTION OF THE DRAWINGS

FIG. 3 are views of a paddle relating to one embodiment of the present invention provided with liquid draining members for draining liquid at three sides, and in which a plurality of square bars are provided in a depth direction of the surface treatment solution.

FIG. 4 are views of a paddle relating to one embodiment of the present invention provided with liquid draining members for draining liquid at two sides, and in which a plurality of square bars are provided in a depth direction of the surface treatment solution.

FIG. 5 are views of a paddle relating to one embodiment of the present invention provided with a liquid draining member for draining liquid at one side, and in which a plurality of square bars are provided in a horizontal direction.

FIG. 6 are views of a paddle relating to one embodiment of the present invention provided with liquid draining members for draining liquid at three sides, and in which a plurality of square bars are provided in a horizontal direction.

FIG. 7 are views of a paddle relating to one embodiment of the present invention provided with liquid draining members for draining liquid at four sides, and in which a plurality of square bars are provided in a horizontal direction.

FIG. 8 are views of a paddle relating to one embodiment of the present invention provided with liquid draining members for draining liquid at three sides, in which a plurality of square bars are provided in a depth direction of the surface treatment solution, and a square bar of the plurality of square bars is provided with a curved surface with respect to the substrate in a cross section in a thickness direction of the square bar.

FIG. 11 is a schematic view of a paddle relating to other embodiment of the present invention viewed from a side.

FIG. 12 are sectional views of FIG. 11, and

FIG. 12(A) is a sectional view along a line a-a' of FIG. 11,

FIG. 12(B) is a sectional view along a line b-b' of FIG. 11,

FIG. 12(C) is a sectional view along a line c-c' of FIG. 11, and

FIG. 12(D) is a sectional view along a line d-d' of FIG. 11.

DETAILED DESCRIPTION OF THE INVENTION

Hereinafter, explaining in detail about preferred embodiments of the present invention, with reference to the drawings. In addition, the embodiments explained in below will not unjustly limit the content of the present invention described in claims, and it is not limited that all the structures explained in the embodiments are necessary as means for solving the problem of the present invention. Explaining about a surface treatment device, a surface treatment method and a paddle relating to one embodiment of the present invention in the following order.

1. Surface treatment device
2. Paddle
3. Surface treatment method

[1. Surface Treatment Device]

Figure 1:
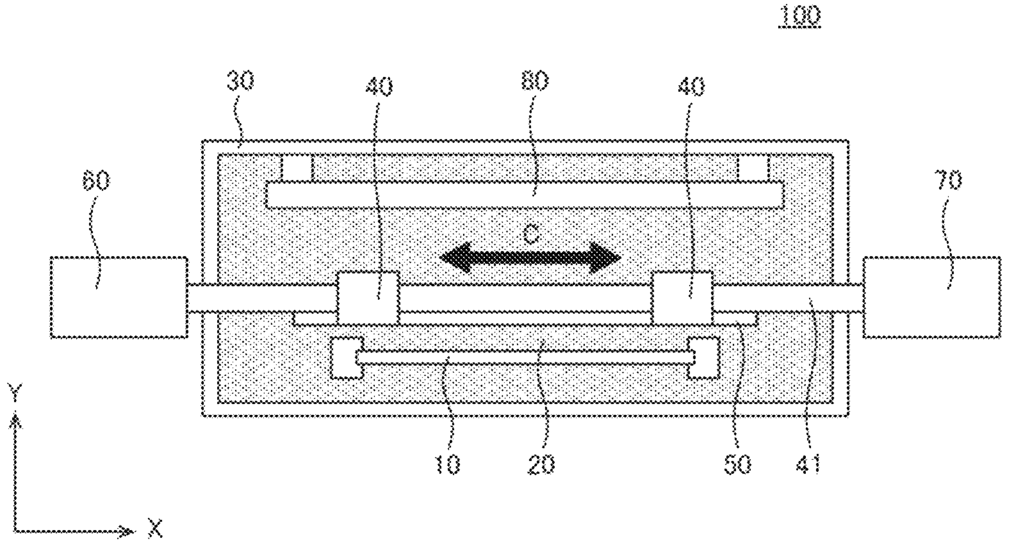
FIG. 1 is a schematic view illustrating a surface treatment device relating to one embodiment of the present invention viewed from above.

As illustrated in FIG. 1, a surface treatment device 100 relating to one embodiment of the present invention comprises at least one paddle 50 in a plate shape, in a surface treatment tank 30, for stirring a surface treatment solution 20 near an object 10 to be plated by reciprocally moving the paddle 50 in a longitudinal direction (X direction) of the surface treatment tank 30 with respect to the object 10 to be plated, as an arrow C. And, the paddle 50 is configured by integrally forming a plurality of square bars provided in a depth direction or a horizontal direction of the surface treatment solution at regular intervals along the object 10 to be plated, and a liquid draining member 58 for draining a liquid is arranged in at least one side of an end of the paddle 50. It is explained in detail in below.

The paddle 50 is fixed to a pole brace 41 by fixing members 40, for example as illustrated in FIG. 1, and a powering means 60 for moving the pole brace 41, and a bearing 70 may be provided. In addition, the paddle 50 is arranged between an anode 80 and the object 10 to be plated.

It is preferable that the paddle 50 is arranged in parallel to the object 10 to be plated in a stationary condition. In addition, the paddle 50 is reciprocally moved in a longitudinal direction (X direction) of the surface treatment tank 30 as the arrow C, but it is preferable that the paddle 50 is reciprocally moved in parallel to the object 10 to be plated. In this way, it is possible to stir the surface treatment solution 20 near the object 10 to be plated more uniformly. In addition, in the surface treatment tank 30 illustrated in FIG. 1, a longitudinal direction is an X direction, but in a case of a surface treatment tank in which a longitudinal direction is a Y direction, the paddle 50 is reciprocally moved in a lateral direction (X direction) of the surface treatment tank. In other words, the paddle 50 is reciprocally moved in parallel to the object 10 to be plated.

In addition, other than stirring by the paddle 50, a bubbling device may be mounted in the surface treatment tank 30, and the stirring by the paddle 50 may be combined with the stirring by bubbling. In this way, it is preferable for a case when oxygen is necessary in a surface treatment solution and when dissolved oxygen should be increased.

In addition, in FIG. 1, the paddle 50 is arranged at one side with respect to the substrate , but it may be arranged at both sides of the substrate. In this way, it is possible to stir more efficiently, when stirring at both sides is necessary. In addition, more than two paddles may be arranged at one side or both sides of the substrate. A number of paddles is adjusted accordingly according to a size of the surface treatment tank and a number of processing of the substrate.

Figure 2:
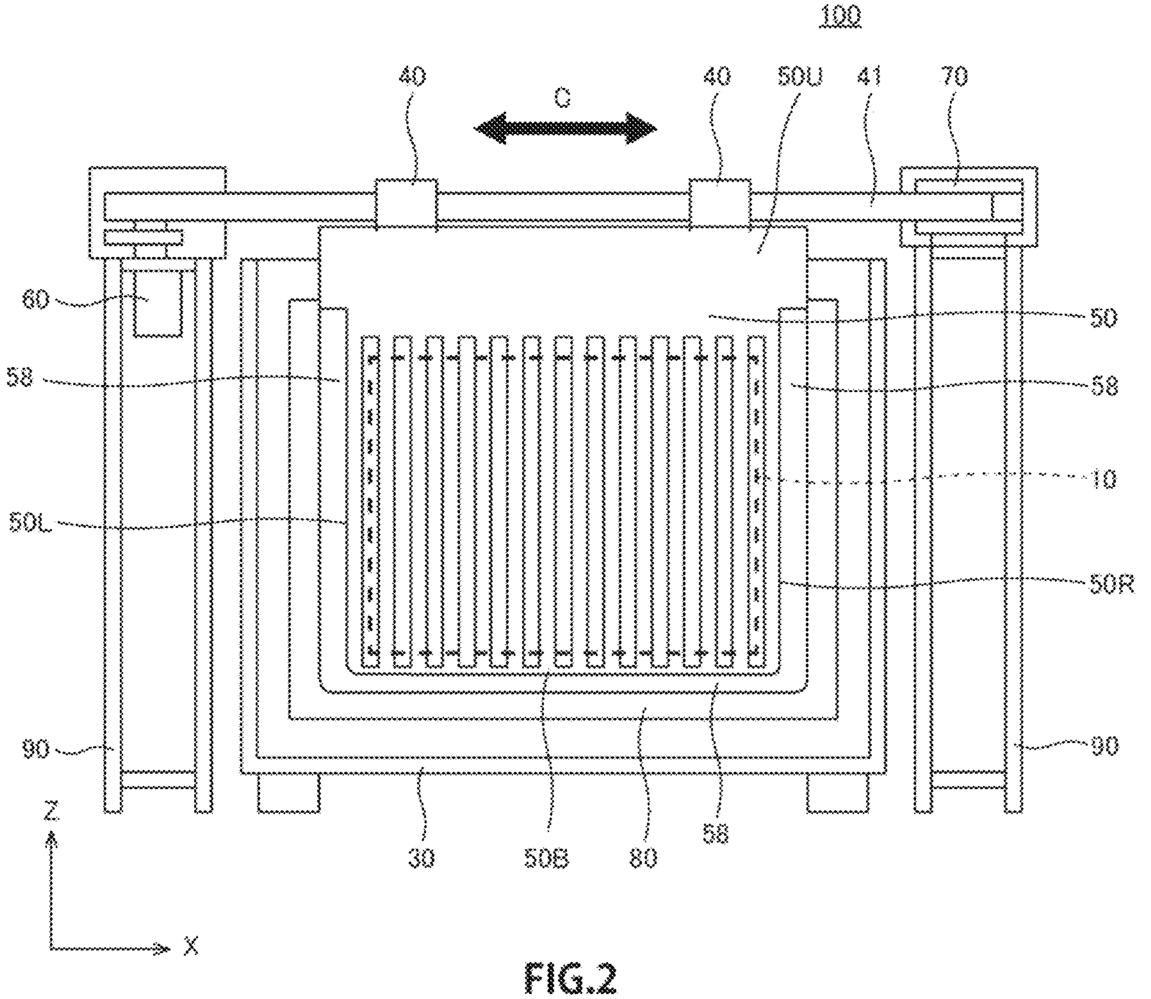
FIG. 2 is a schematic view illustrating a surface treatment device relating to one embodiment of the present invention viewed from a side.

Next, explaining using FIG. 2. FIG. 2 is a schematic view illustrating a surface treatment device 100 relating to one embodiment of the present invention viewed from a side. As illustrated in FIG. 2, the paddle 50 comprised in the surface treatment device 100 is configured by integrally forming a plurality of square bars provided in a depth direction (Z direction) of the surface treatment solution at regular intervals. In this way, it is possible to improve a strength of the paddle 50. In addition, the square bars may be provided in a horizontal direction (X direction).

The surface treatment device 100 relating to one embodiment of the present invention is provided with a liquid draining member 58 for draining a liquid in at least one side of an end of the paddle 50. As used herein, the term “draining” may be used synonymously with “stirring” or “mixing” the surface treatment solution. By having the liquid draining member 58, it is possible to decrease a turbulent flow of the surface treatment solution. The turbulent flow of the surface treatment solution generates an unexpected vibration in the paddle 50. The unexpected vibration prevents uniform stirring of the object to be plated and the surface treatment solution. In this case, when the surface treatment solution is a plating solution, a film thickness of a plating will may be nonuniform. Further, it will be a cause of a collision of the paddle 50 and the object to be plated, and there is a risk that the object to be plated will be damaged.

A shape of the liquid draining member 58 is preferably a tapered shape or a circular shape in a cross section in a thickness direction of the liquid draining member 58. In this way, when the paddle 50 performs a stroke, the surface treatment solution can be drained properly, and further, a generation of a turbulent flow can be decreased. In addition, configurations of the paddle 50 used in the surface treatment device 100 relating to one embodiment of the present invention is described in detail in [2. Paddle].

In addition, as mentioned above, the paddle 50 is fixed to the pole brace 41 for example by the fixing members 40, and the powering means 60 for moving the pole brace 41, and the bearing 70 may be provided. Further, a frame 90 for supporting the powering means 60 and the bearing 70 may be provided.

As illustrated in FIG. 2, the paddle 50 moves reciprocally as the arrow C. At this time, it is preferable to further comprise the powering means 60 for moving the paddle 50 reciprocally with a moving speed of 35 to 600 mm/s, and with a stroke of 50 to 200 mm. As the powering means 60, for example a motor or other publicly known means may be used. By using these powering means, a moving speed and a stroke may be adjusted. In some cases, it may perform a stroke in upward and downward directions. A stoke speed and a distance at this time are as the above. In addition, the stroke in upward and downward directions may be a rocking motion by a shock cylinder.

Further, it is preferable that the object 10 to be plated is arranged at inner side of ends of the paddle 50 (upper end 50U, right end 50R, left end 50L, bottom end 50B) in a stationary condition of the paddle 50. In this way, it is possible to stir the surface treatment solution 20 near the object 10 to be plated more uniformly at corners of the object 10 to be plated. More preferably, it is preferable that the object 10 to be plated is arranged at inner side of ends of the paddle 50 (upper end 50U, right end 50R, left end 50L, bottom end 50B) in an operating condition of the paddle 50.

The surface treatment device 100 relating to one embodiment of the present invention can be applied to an electrolytic plating, an electroless plating or other appropriately desired plating, and especially, it is preferable to be applied to a via hole filling and/or a through hole filling. In a plating for a via hole filling or a through hole filling, a filling performance will be improved, as additives such as a brightener or a leveler functions efficiently, by stirring efficiently as mentioned above.

The surface treatment device 100 relating to one embodiment of the present invention can be applied to a pre-treatment and a post-treatment of a plating. Especially, it is preferable when efficient stirring of the solution is required. Thus, the surface treatment device 100 relating to one embodiment of the present invention can exert an effect of additives contained in a plating solution or in a surface treatment solution such as a pre-treatment solution and a post-treatment solution for a plating more efficiently, by stirring efficiently as mentioned above.

In addition, as the object 10 to be plated, an object in plate shape such as a printed circuit board, or an uneven object to be decorated can be cited. In addition, the surface treatment device 100 relating to one embodiment of the present invention is effective to the object 10 to be plated provided with holes such as through holes and via holes, especially with high aspect ratio, and to the uneven object.

From the above, according to the surface treatment device 100 relating to one embodiment of the present invention, it is possible to uniformly stir the surface treatment solution 20 near the object 10 to be plated. And, by stirring uniformly, it is possible to uniformize a plating thickness as ion exchange at a surface of the substrate becomes uniform. In addition, it is possible to provide the surface treatment device with improved strength.

[2. Paddle]

Figure 3A:
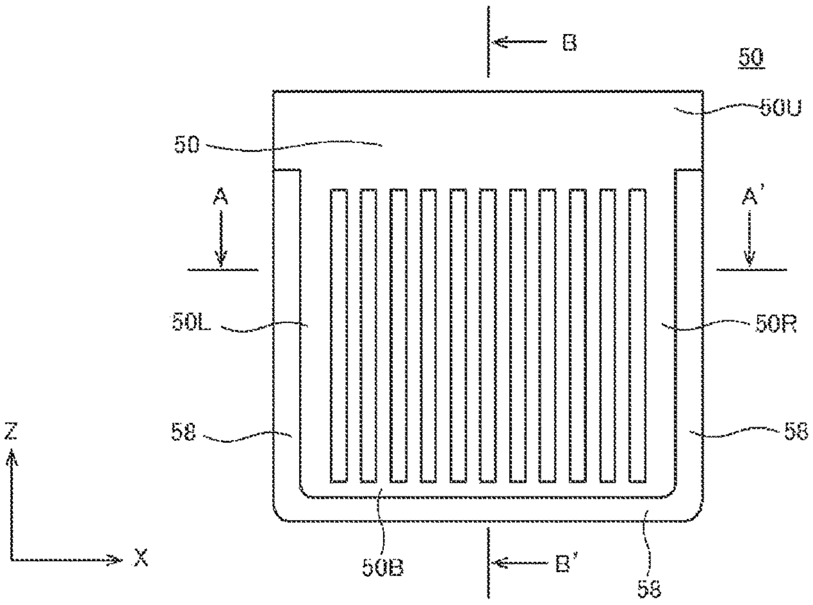
FIG. 3(A) is a schematic view of the paddle viewed from a side.
Figure 3B:
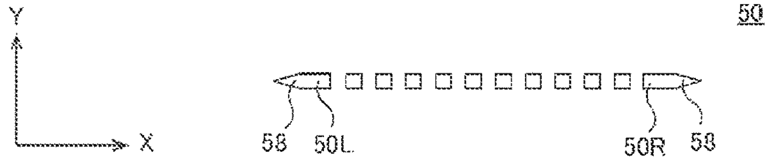
FIG. 3(B) is a sectional view along a line A-A' of FIG. 3(A)
Figure 3C:
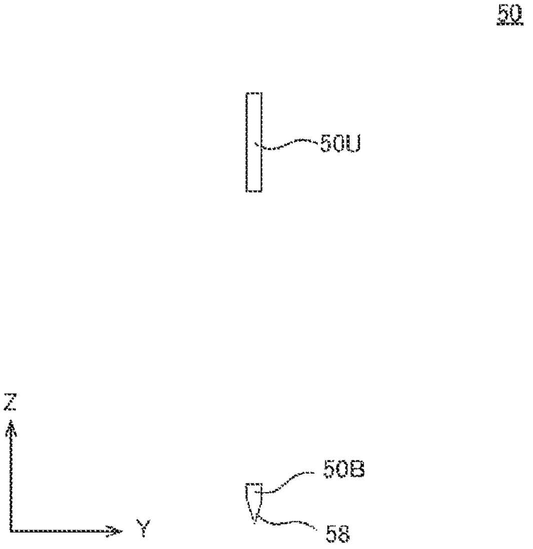
FIG. 3(C) is a sectional view along a line B-B' of FIG. 3(A).

Next, explaining about a paddle 50 used in the surface treatment device 100 relating to one embodiment of the present invention. The paddle 50 relating to one embodiment of the present invention is a paddle in a plate shape for stirring a surface treatment solution near an object 10 to be plated by moving the paddle 50 reciprocally with respect to the object 10 to be plated. As illustrated in FIG. 3A, FIG. 3B and FIG. 3C, the paddle 50 is configured by integrally forming a plurality of square bars provided in one direction at regular intervals, and a liquid draining member 58 for draining a liquid is arranged in at least one side of an end of the paddle 50.

By configuring as the paddle 50 relating to one embodiment of the present invention, it is possible to stir the surface treatment solution uniformly, and also, a shielding effect will not be occurred when plating. A shielding effect may be occurred according to a shape of a paddle, so it is preferable to configure a paddle in a shape of the paddle 50 used in the surface treatment device 100 relating to one embodiment of the present invention. Further, it is possible to decrease a generation of a turbulent flow in the surface treatment solution.

A shape of the liquid draining member 58 is preferably a tapered shape or a circular shape in a cross section in a thickness direction of the liquid draining member 58. In this way, when the paddle 50 performs a stroke, the surface treatment solution can be drained properly, and further, a generation of a turbulent flow can be decreased.

As illustrated in FIG. 3A, the liquid draining member 58 may be arranged at three sides of the paddle 50, i.e. at a right end 50R of the paddle, a left end 50L of the paddle, and a bottom end 50B of the paddle. In this way, when the paddle 50 performs a stroke in left and right directions, it is possible to drain the surface treatment solution in left and right directions, and it is possible to decrease a generation of a turbulent flow. In addition, when the surface treatment solution is lower than the paddle, and when the paddle 50 performs a stroke in upward and downward direction, and when the stroke of the paddle in upward and downward direction is performed using a shock cylinder, a liquid draining of the surface treatment solution near the lower end 50B of the paddle is effective.

In addition, a sectional view along a line A-A' of FIG. 3A is as illustrated in FIG. 3B, and the liquid draining member 58 is arranged at the right end 50R of the paddle and the left end 50L of the paddle. In addition, a sectional view along a line B-B' of FIG. 3A is as illustrated in FIG. 3C, and the liquid draining member 58 is arranged at the bottom end 50B of the paddle.

Figure 4A:
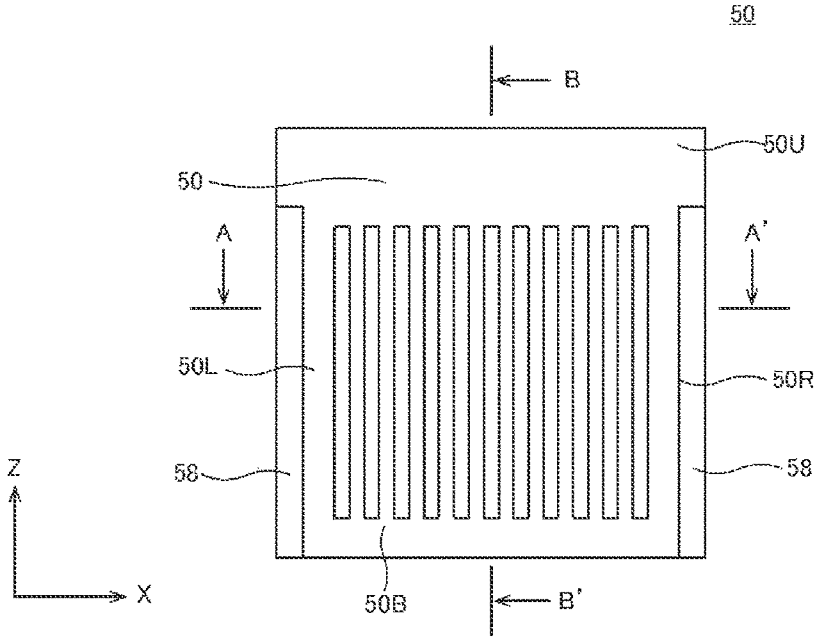
FIG. 4(A) is a schematic view of the paddle viewed from a side.

As illustrated in FIG. 4A, the liquid draining member 58 may be arranged at the right end 50R of the paddle and the left end 50L of the paddle. In this way, a liquid draining is effective, especially when the paddle 50 performs a stroke in left and right directions. The paddle 50 illustrated in FIG. 4A has fewer liquid draining member than the paddle 50 illustrated in FIG. 3A, so a processing cost of the paddle 50 is low.

Figure 4B:
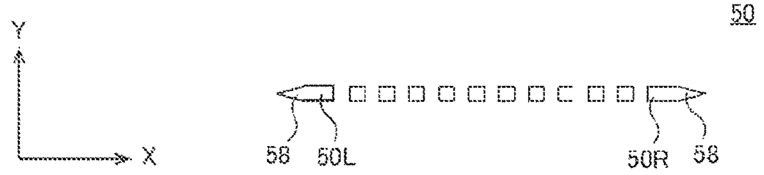
FIG. 4(B) is a sectional view along a line A-A' of FIG. 4(A)
Figure 4C:
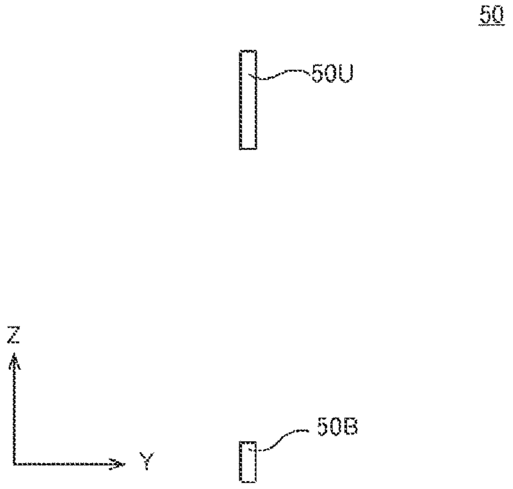
FIG. 4(C) is a sectional view along a line B-B' of FIG. 4(A).

In addition, a sectional view along a line A-A' of FIG. 4A is as illustrated in FIG. 4B, and the liquid draining member 58 is arranged at the right end 50R of the paddle and the left end 50L of the paddle. In addition, a sectional view along a line B-B' of FIG. 4A is as illustrated in FIG. 4C, and the liquid draining member 58 is not arranged at the bottom end 50B of the paddle in the configuration of the paddle 50 illustrated in FIG. 4A.

Figure 5A:
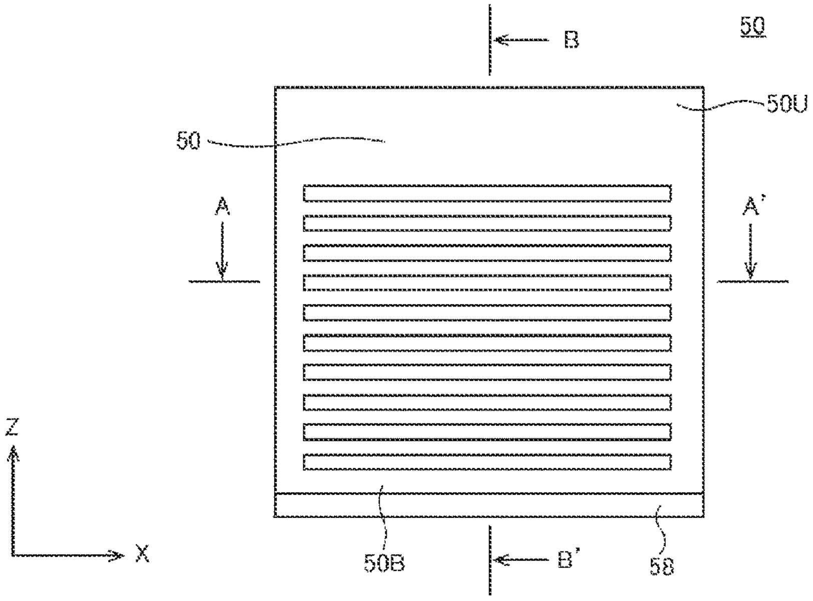
FIG. 5(A) is a schematic view of the paddle viewed from a side.

As illustrated in FIG. 5A, the liquid draining member 58 may be arranged at the bottom end 50B of the paddle. In this way, a liquid draining of the surface treatment solution is effective near the bottom end 50B of the paddle, when the paddle 50 performs a stroke in upward and downward directions. The paddle 50 illustrated in FIG. 5A has fewer liquid draining member than the paddle 50 illustrated in FIG. 3A or FIG. 4A, so a processing cost of the paddle 50 is low.

Figure 5B:
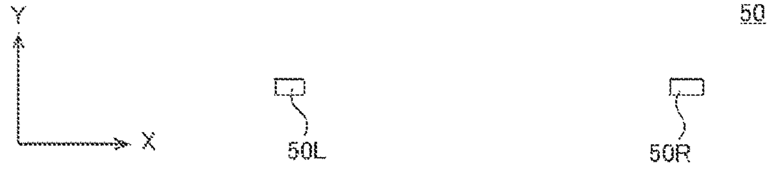
FIG. 5(B) is a sectional view along a line A-A' of FIG. 5(A)
Figure 5C:
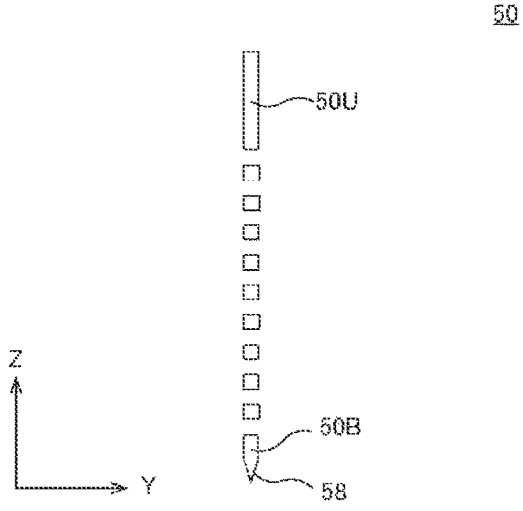
FIG. 5(C) is a sectional view along a line B-B' of FIG. 5(A).

In addition, a sectional view along a line A-A' of FIG. 5A is as illustrated in FIG. 5B, and the liquid draining member 58 is not arranged at the right end 50R of the paddle and the left end 50L of the paddle. In addition, a sectional view along a line B-B' of FIG. 5A is as illustrated in FIG. 5C, and the liquid draining member 58 is arranged at the bottom end 50B of the paddle.

In addition, in the paddle 50 illustrated in FIG. 5, a plurality of square bars are provided in a horizontal direction (X direction) of the surface treatment solution. In this way, it is possible to stir the surface treatment solution near the substrate uniformly, when the paddle 50 performs a stroke in upward and downward directions.

Figure 6A:
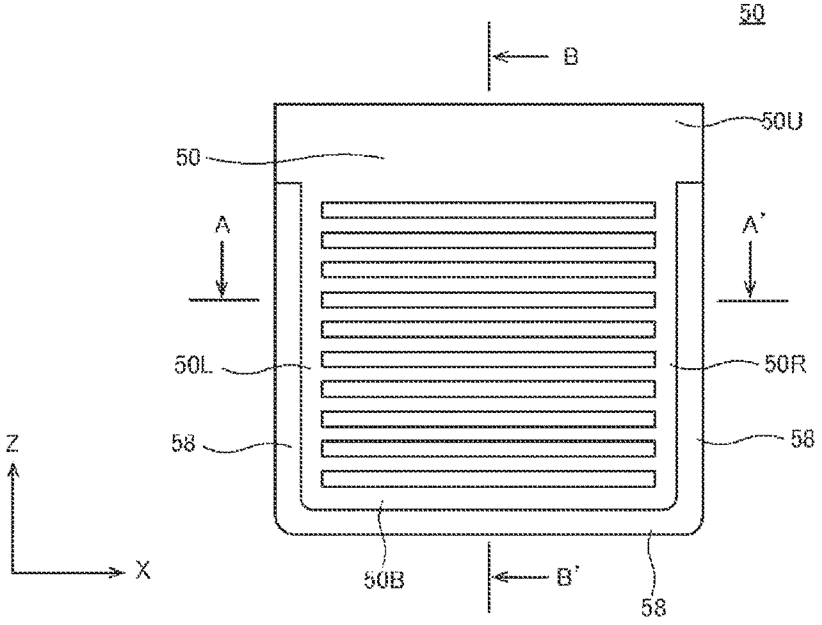
FIG. 6(A) is a schematic view of the paddle viewed from a side.

As illustrated in FIG. 6A, the liquid draining member 58 may be arranged at a right end 50R of the paddle, a left end 50L of the paddle, and a bottom end 50B of the paddle. In this way, when the paddle 50 performs a stroke in left and right directions and in upward and downward directions, it is possible to drain the surface treatment solution in left and right directions and in upward and downward directions, and it is possible to decrease a generation of a turbulent flow. In addition, a liquid draining is effective when the surface treatment solution is lower than the paddle.

Figure 6B:
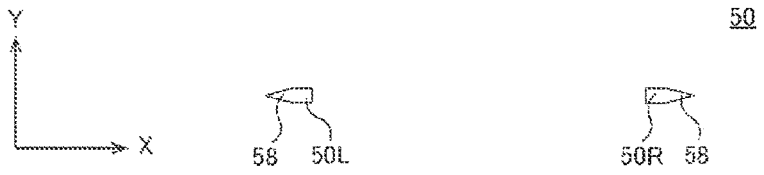
FIG. 6(B) is a sectional view along a line A-A' of FIG. 6(A)
Figure 6C:
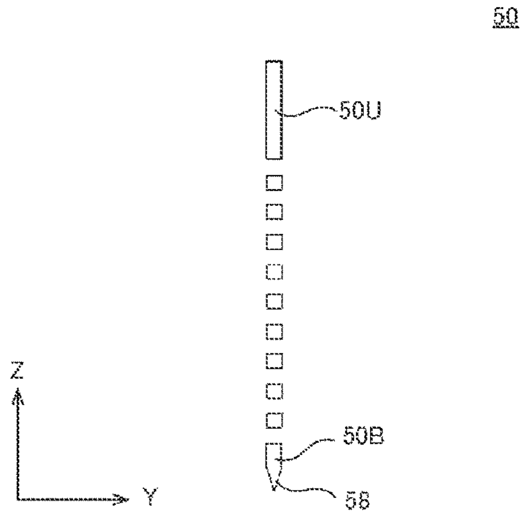
FIG. 6(C) is a sectional view along a line B-B' of FIG. 6(A).

In addition, a sectional view along a line A-A' of FIG. 6A is as illustrated in FIG. 6B, and the liquid draining member 58 is arranged at the right end 50R of the paddle and the left end 50L of the paddle. In addition, a sectional view along a line B-B' of FIG. 6A is as illustrated in FIG. 6C, and the liquid draining member 58 is arranged at the bottom end 50B of the paddle.

In addition, in the paddle 50 illustrated in FIG. 6, a plurality of square bars are provided in a horizontal direction (X direction) of the surface treatment solution. In this way, it is possible to stir the surface treatment solution near the substrate uniformly, when the paddle 50 performs a stroke in upward and downward directions.

Figure 7A:
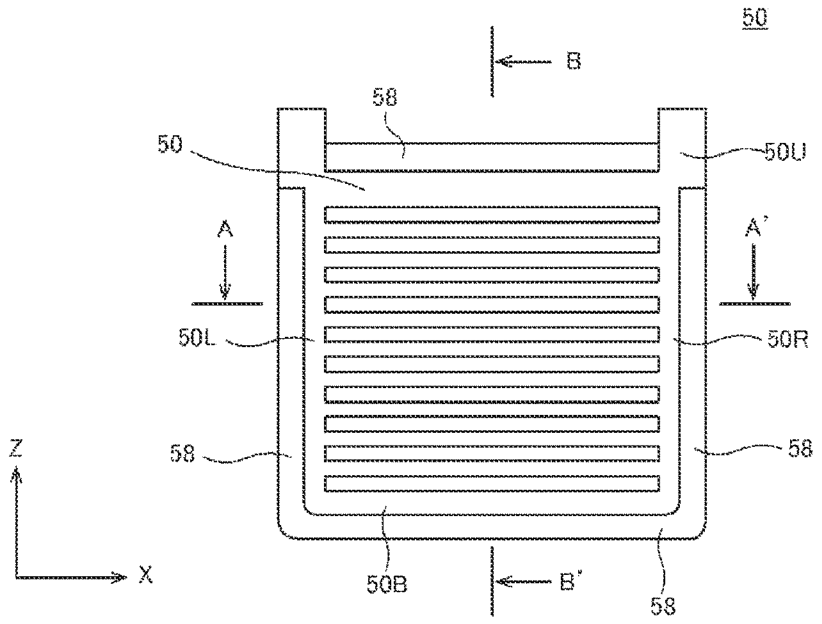
FIG. 7(A) is a schematic view of the paddle viewed from a side.

As illustrated in FIG. 7A, the liquid draining member 58 may be arranged at a right end 50R of the paddle, a left end 50L of the paddle, a bottom end 50B of the paddle, and an upper end 50U of the paddle. In this way, when the paddle 50 performs a stroke in left and right directions and in upward and downward directions, it is possible to drain the surface treatment solution in left and right directions and in upward and downward directions, and it is possible to decrease a generation of a turbulent flow. In addition, a liquid draining is effective when the surface treatment solution is little lower than the paddle.

Figure 7B:
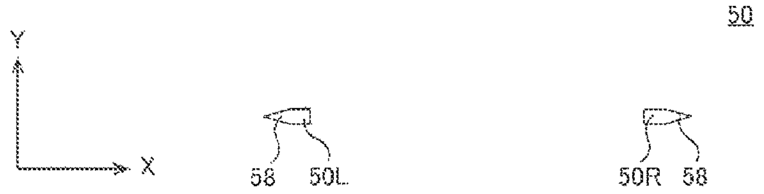
FIG. 7(B) is a sectional view along a line A-A' of FIG. 7(A)
Figure 7C:
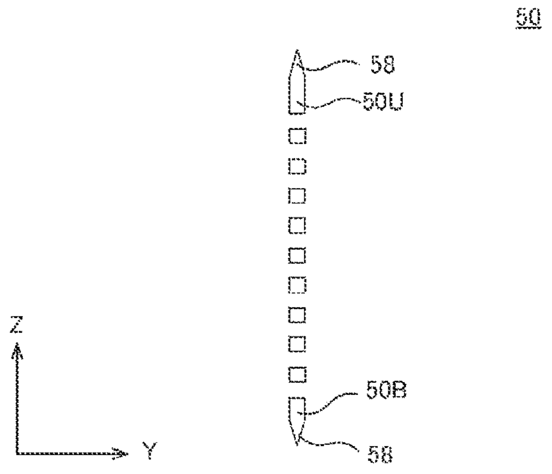
FIG. 7(C) is a sectional view along a line B-B' of FIG. 7(A).

In addition, a sectional view along a line A-A' of FIG. 7A is as illustrated in FIG. 7B, and the liquid draining member 58 is arranged at the right end 50R of the paddle and the left end 50L of the paddle. In addition, a sectional view along a line B-B' of FIG. 7A is as illustrated in FIG. 7C, and the liquid draining member 58 is arranged at the bottom end 50B of the paddle and the upper end 50U of the paddle.

In addition, in the paddle 50 illustrated in FIG. 7, a plurality of square bars are provided in a horizontal direction (X direction) of the surface treatment solution. In this way, it is possible to stir the surface treatment solution near the substrate uniformly, when the paddle 50 performs a stroke in upward and downward directions.

Figure 8A:
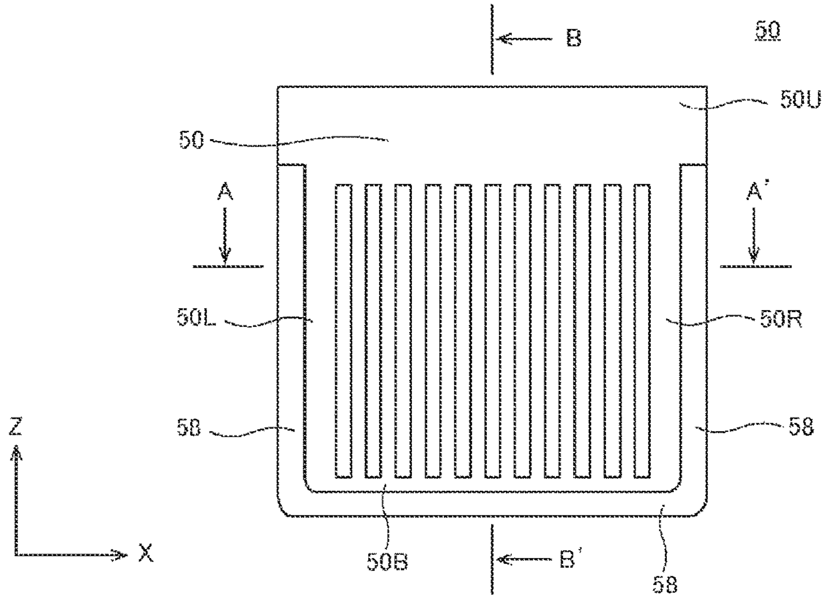
FIG. 8(A) is a schematic view of the paddle viewed from a side.
Figure 8B:
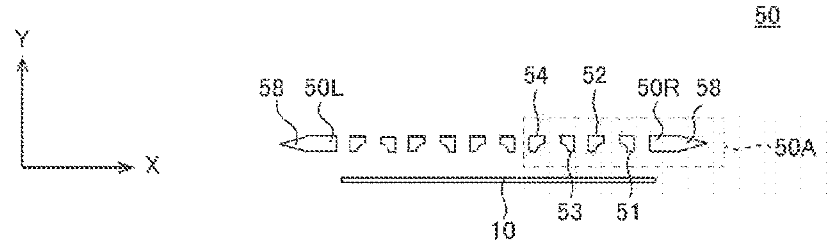
FIG. 8(B) is a sectional view along a line A-A' of FIG. 8(A)
Figure 8C:
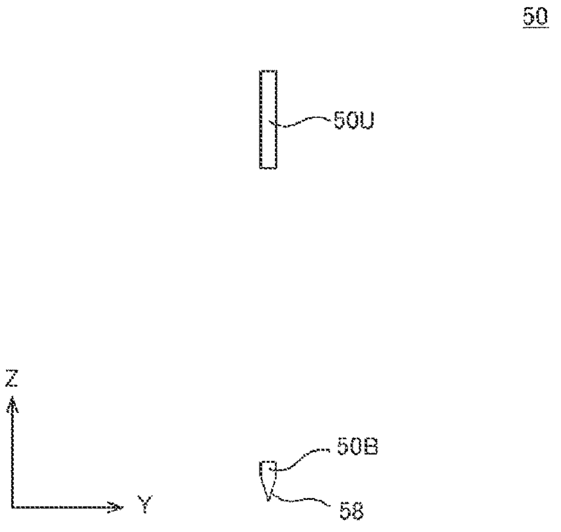
FIG. 8(C) is a sectional view along a line B-B' of FIG. 8(A).

As illustrated in FIG. 8A, the liquid draining member 58 is arranged at a right end 50R of the paddle, a left end 50L of the paddle, and a bottom end 50B of the paddle, but there is a further feature in a plurality of square bars. FIG. 8B is a sectional view along a line A-A' in FIG. 8A. As illustrated in FIG. 8B, it is preferable that a square bar 51, 52, 53, 54 (reference number after 54 is omitted) is provided with a curved surface with respect to the object 10 to be plated, in a cross section in a thickness direction of the square bar (A-A' cross section). In other words, as illustrated in FIG. 8B, the curved surface is provided to curve inwardly in a cross section in a thickness direction of the square bar. In addition, it is preferable that the curved surface is provided alternately facing left and facing right with respect to the object 10 to be plated. In other words, as illustrated in FIG. 8B, the square bar 51 with the curved surface facing left and the square bar 52 with the curved surface facing right are arranged alternately, and cross- sectional shapes of adjacent square bars 51, 52, 53, 54 are being symmetrical respectively. In this way, it is possible to stir more uniformly, as a surface treatment solution can be captured with respect to both moving directions to the left and to the right in an X direction, when the paddle is moved reciprocally. In addition, a sectional view along B-B' of FIG. 8A is as illustrated in FIG. 8C. In general, a surface treatment paddle as presented in FIGS. 2 through 8 may include a plurality of square bars arranged at regular intervals. The intervals may correspond to distances between the square bars. These distances correspond to spacing between adjacent square bars in an X direction or in a Z direction referenced to an XZ-coordinate axis. The X direction corresponds to a horizontal direction, and the Z direction corresponds to a vertical (i.e., a depth) direction. In one aspect, the intervals have a distance apart of 10 to 30 mm, as indicated in the various embodiments presented in FIGS. 2 through 8 and as described herein.

In addition, FIG. 8A is a view in which a plurality of square bars are provided in a depth direction of the surface treatment direction, but when a plurality of square bars are provided in a horizontal direction of the surface treatment solution, a sectional shape of the plurality of square bars in a thickness direction will also be FIG. 8B. In other words, a sectional view along a line B-B' of FIG. 8A will be FIG. 8B.

Figure 9:
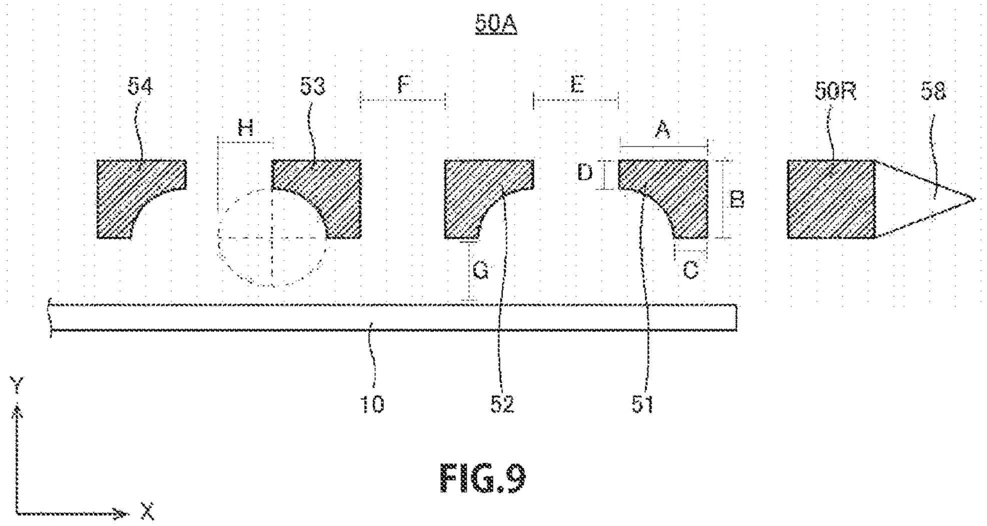
FIG. 9 is an enlarged view of a part of FIG. 8.

Next, explaining about the paddle 50 in more detail, using FIG. 9 which is an enlarged view of a part 50A illustrated in FIG. 8B. The paddle 50 (50A) is configured by integrally forming a plurality of square bars provided in a depth direction or a horizontal direction of the surface treatment solution at regular intervals along the object 10 to be plated. It is preferable that the square bar 51, 52, 53, 54 comprises a side of 5 to 10 mm in length. When indicating by reference numbers of FIG. 9, among four sides of a quadrangle, a size of sides A and B not formed with a curved surface is as A=5 to 10 mm and B=5 to 10 mm. In this way, it will be an optimum size for stirring the surface treatment solution, and it is possible to uniformize a plating thickness by uniformly stirring the surface treatment solution, and also, it is possible to improve a strength more. Further, a strength of the paddle is also improved. In addition, it is preferable that C=2 to 5 mm and D=2 to 5 mm.

When sides A and/or B of the square bar 51, 52, 53, 54 become less than 5 mm, the square bar will be small, so a stirring force may be decreased. On the other hand, when sides A and/or B of the square bar become more than 10 mm, a stirring force will be improved, but there is a concern that a weight of the device will be heavy.

In addition, it is preferable that the intervals of the square bars are formed in a distance of 10 to 30 mm. When indicating by reference numbers of FIG. 9, E=10 to 30 mm and F=10 to 30 mm. In this way, the paddle 50 does not shield the object 10 to be plated with respect to an anode 80, and an energization from the anode 80 to the object 10 to be plated is secured, and also, it is possible to uniformize a plating thickness more by stirring the surface treatment solution uniformly. When the intervals become less than 10 mm, a shielding effect with respect to the anode 80 will occur when plating, and an energization from the anode 80 to the object 10 to be plated cannot be secured, and there is a case that it is difficult to uniformize a plating thickness. On the other hand, when the intervals become more than 30 mm, a number of the square bars themselves provided at the paddle 50 will be decreased, so there is a case that it is difficult to stir the surface treatment solution near the object 10 to be plated efficiently.

It is preferable that the curved surface comprises a radius of 3 to 10 mm. When indicating by reference numbers of FIG. 9, H=3 to 10 mm. In this way, it will be an optimum curved surface of the paddle, and it is possible to uniformize a plating thickness by stirring the surface treatment solution more uniformly by capturing the surface treatment solution more efficiently, and also, and it is possible to improve a strength of the paddle 50 more. When a radius of the curved surface becomes less than 3 mm, there is a case that it is not possible to capture the surface treatment solution more efficiently as an area of the curved surface is decreased. On the other hand, when a radius of the curved surface becomes more than 10 mm, there is a case that a strength of the paddle 50 is decreased.

In the paddle 50 used in the surface treatment device 100 relating to one embodiment of the present invention, the square bars are integrally formed at regular intervals and provided with the curved surface. In addition, it is preferable that a cross-sectional shape of the paddle 50 (50A) will be the square bars 51 to 54 illustrated in FIG. 9. Here, a shape of the paddle for stirring the surface treatment solution may not be in the cross-sectional shape illustrated in FIG. 9, and shapes indicated in the prior arts such as trapezoid, rhombus, triangle, crescent, simply L-shape or T-shape may be considered, but trapezoid, rhombus and triangle are not sufficient in capturing the surface treatment solution efficiently, and it is difficult to stir efficiently. In addition, there is a concern that crescent is insufficient in strength. Thus, the paddle with the cross-sectional shape illustrated in FIG. 9 is able to stir the surface treatment solution most efficiently, and also, it is possible to improve a strength of the paddle 50 and also the surface treatment device 100.

In addition, it is preferable that a distance between the paddle 50 (50A) and the object 10 to be plated is 10 to 30 mm. When indicating by reference numbers of FIGS. 9, G=10 to 30 mm. When the distance is less than 10 mm, there is a significant concern that the paddle will contact the substrate. When the distance is more than 30 mm, a distance between the paddle 50 and the object 10 to be plated will be apart, so there is a case that a stirring force will be decreased.

Figure 10A:
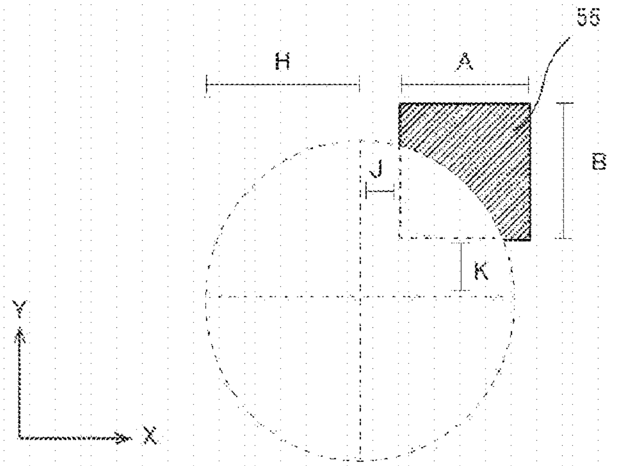
FIG. 10 shows additional examples of parameters of the curved surface provided at the square bar.
Figure 10B:
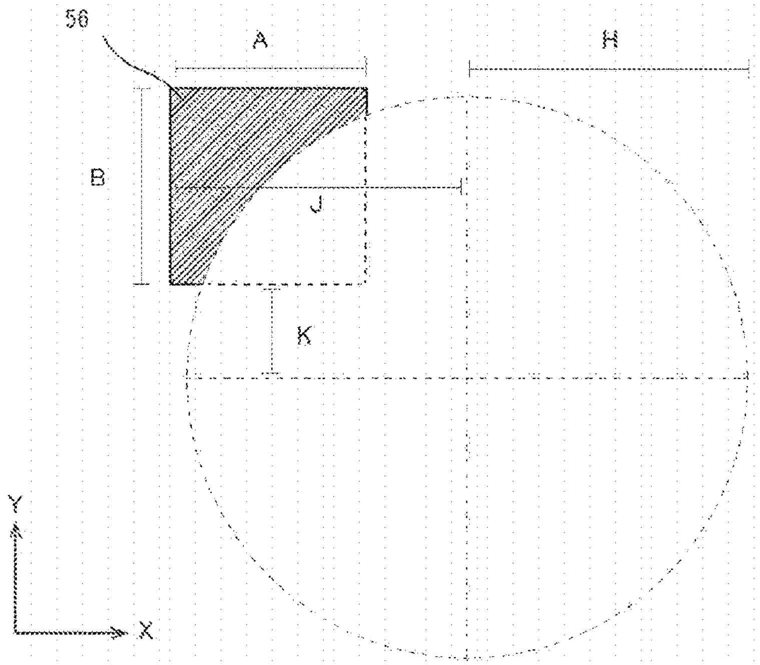
Figure 10C:
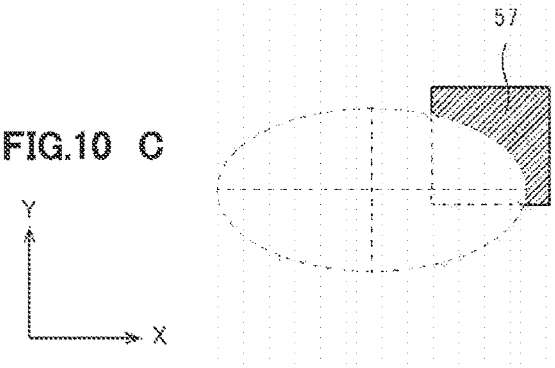
Figure 10D:
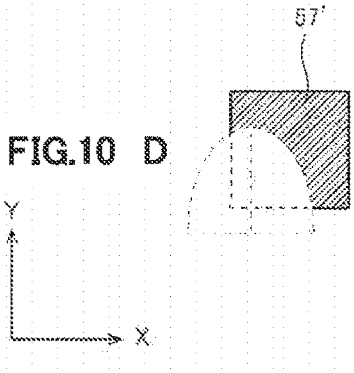

Further, as additional examples of parameters of a curved surface in the paddle 50, as illustrated in FIG. 10A, FIG. 10B, FIG. 10C and FIG. 10D, it may be A, B=5 to 10, H=1 to 15, J=−15 to 15, K=−15 to 15 (however, regarding J and K, outside of a square bar 55 is indicated as +, and inside of the square bar 55 is indicated as −). For example, as parameters of a curved surface of the square bar 55 illustrated in FIG. 10A, it will be A=6, B=8, H=8, J=3, K=2. In addition, for example, as parameters of a curved surface of a square bar 56 illustrated in FIG. 10B, it will be A=10, B=10, H=15, J=−15, K=5. In addition, the curved surface is illustrated as true circle for convenience sake, but as illustrated in FIG. 10C and FIG. 10D, a curved surface provided at square bars 57, 57' may be oval or parabola. It is fine as long as it is having such curved surface.

From the above, according to the paddle 50 relating to one embodiment of the present invention, it is possible to provide the paddle capable of improving a strength and uniformizing a plating thickness by uniformly stirring the surface treatment solution near the substrate.

As other embodiment of the paddle 50 relating to one embodiment of the present invention, it may be in a shape illustrated in FIG. 11, other than a grid shape illustrated in FIG. 3A. The paddle 150 illustrated in FIG. 11 is in a plate shape, and a plurality of through holes are provided in rows in left right and up down directions, and a plurality of counterbores (concave) in a spherical shape are provided in an area other than an area provided with the through holes. In addition, the counterbores may be arranged at a position adjacent to the through holes and/or at a position that the through holes are being diagonal to each other. Further, it is preferable that a liquid draining member for draining a liquid is arranged in at least one side of an end of the paddle 150. A number, a position to be arranged, and a shape of the liquid draining member arranged at the paddle are also as indicated in the above.

Sectional view along line a-a' of FIG. 11 is illustrated in FIG. 12(A), sectional view along line b-b' of FIG. 11 is illustrated in FIG. 12(B), sectional view along line c-c' of FIG. 11 is illustrated in FIG. 12(C), and sectional view along line d-d' of FIG. 11 is illustrated in FIG. 12(D). As illustrated in FIG. 12(A) and FIG. 12(C), a plurality of counterbores may be arranged at rows in which through holes are arranged in left right and up down directions. As illustrated in FIG. 12(B) and FIG. 12(D), a plurality of counterbores may be arranged additionally at rows in which through holes are not arranged in left right and up down directions. It is possible to stir more uniformly, and also, a processing of counterbores is easier, when counterbores are arranged in straight lines in left right and up down directions as the above. In addition, the counterbore may not be true circle, and it may be oval or other appropriately desired shape in a cross section, and it is fine as long as it is having a curved surface.

The through hole may be in a shape of quadrangle or circle. It is preferable that a size of the through hole is 10 to 30 mm. A depth of the counterbore may be 3 to 8 mm, and a radius of the counterbore may be R=3 to 8 mm. It is preferable that a thickness of a plate of the paddle is 5 to 10 mm.

In this way, it is also possible to perform a stirring in a Z direction in FIG. 11 efficiently. In this case, it is especially effective when a reciprocal movement in longitudinal or lateral direction with respect to the surface treatment tank is impossible due to a small space.

Figure 13:
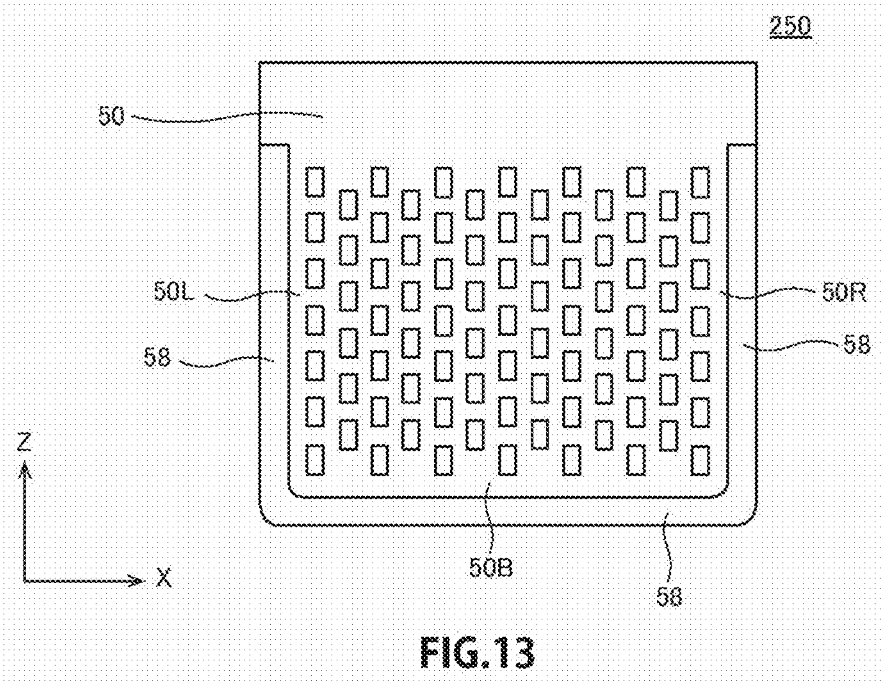
FIG. 13 is a schematic view of a paddle provided with through holes arranged in zigzag viewed from a side.

In addition, as illustrated in FIG. 13, in a paddle 250, through holes may be arranged in zigzag. In this way, it is possible to perform stirring in a Z direction effectively, and also, it is possible to uniformize a plating thickness more, as a cross rail part always tends not to be a shield with respect to an anode, when the through holes are arranged in zigzag, than when the through holes are not arranged as such. In addition, preferable size and shape of the through holes, and preferable depth of counterbores are as indicated in the above. A number, a position to be arranged, and a shape of the liquid draining member arranged at the paddle are also as indicated in the above.

[3. Surface Treatment Method]

Next, explaining about a surface treatment method relating to one embodiment of the present invention. A surface treatment method relating to one embodiment of the present invention is a method for using at least one paddle in a plate shape for stirring a surface treatment solution near substrate, by reciprocally moving the paddle with respect to the substrate.

And, the paddle is configured by integrally forming a plurality of square bars provided in a depth direction or a horizontal direction of the surface treatment solution at regular intervals along the substrate, and a liquid draining member for draining a liquid is arranged in at least one side of an end of the paddle.

The feature of the paddle 50 used in the surface treatment method relating to one embodiment of the present invention is as mentioned above. In addition, the paddle 150, 250 illustrated in FIG. 11 or FIG. 13 may be used. The surface treatment method relating to one embodiment of the present invention is applicable to a case when a stirring in a plating (electrolytic plating, electroless plating), or a pre-treatment and a post-treatment of the plating is necessary. In addition, applicable or preferable substrate is as mentioned above.

In the surface treatment method relating to one embodiment of the present invention, other than a stirring by the paddle, it may be combined with a stirring by a bubbling. In this way, it is preferable for a case when oxygen is necessary in the surface treatment solution and when dissolved oxygen should be increased.

According to the surface treatment method relating to one embodiment of the present invention, it is possible to provide the surface treatment method capable of stirring for a long period of time, by uniformizing a plating thickness by uniformly stirring the surface treatment solution near the substrate, and by improving a strength of the paddle.

In addition, it is explained in detail about each embodiment of the present invention as the above, but it can be understood easily for those who skilled in the art that various modifications are possible without practically departing from new matters and effect of the present invention. Therefore, all of such variants should be included in the scope of the present invention.

For example, terms described with different terms having broader or equivalent meaning at least once in description and drawings can be replaced with these different terms in any part of description and drawings. In addition, operation and configuration of the surface treatment device, the surface treatment method, and the paddle are not limited to those explained in each embodiment of the present invention, and various modifications can be made.

GLOSSARY OF DRAWING REFERENCES

10 Substrate
20 Surface treatment solution near substrate
30 Surface treatment tank
40 Fixing member
41 Pole brace
50, 150, 250 Paddle
50R Right end of paddle
50B Bottom end of paddle
50L Left end of paddle
50U Upper end of paddle
51, 52, 53, 54, 55, 56, 57, 57' Square bar
58 Liquid draining member
60 Powering means
70 Bearing
80 Anode
90 Frame
100 Surface treatment device

The invention claimed is:

1. A surface treatment device comprising at least one paddle in a plate shape, in a surface treatment tank, for stirring a surface treatment solution near a substrate by reciprocally moving the paddle with respect to the substrate, wherein the paddle includes a plurality of square bars provided in a depth direction or a horizontal direction of the surface treatment solution and said plurality of square bars provided at regular intervals along the substrate, said plurality of square bars being integrally formed in the paddle, and a structure with a tapered or circular cross-section for decreasing a generation of turbulent flow while mixing a liquid is arranged on at least one side of an end of the paddle, wherein the square bars are located in a central region of the paddle to reduce vibration in the paddle and provide uniform stirring of the surface treatment solution, and wherein the structure is located in a region of the paddle that is outside of the central region; wherein a shape of the structure is a tapered shape or a circular shape in a cross section in a thickness direction of the structure; wherein each square bar of the plurality of square bars is provided with a curved surface with respect to the substrate in a cross section in a thickness direction of the plurality of square bars, and the curved surface is provided alternately facing left and facing right with respect to the substrate;

wherein each square bar of the plurality of square bars comprises a side of 5 to 10 mm in length; and wherein each square bar of the plurality of square bars includes a curved surface having a radius of 3 to 10 mm.

2. The surface treatment device according to claim 1, wherein the intervals are distances between the square bars, wherein the distances correspond to spacing between adjacent square bars in an X direction or in a Z direction referenced to an XZ-coordinate axis, wherein the X direction is the horizontal direction and the Z direction is the depth direction, and wherein the intervals have a distance apart of 10 to 30 mm.

3. The surface treatment device according to claim 1, wherein a distance between the paddle and the substrate is 10 to 30 mm.

4. The surface treatment device according to claim 1, further comprising a means for powering for reciprocally moving the paddle with a stroke of 50 to 200 mm, and with a moving speed of 35 to 600 mm/s.

5. The surface treatment device according to claim 1, wherein the paddle extends past both ends of the substrate.

6. A paddle in a plate shape for stirring a surface treatment solution near a substrate by reciprocally moving the paddle with respect to the substrate, wherein the paddle is configured by integrally forming a plurality of square bars provided in one direction at regular intervals along the substrate, said plurality of square bars being integrally formed in the paddle, and a structure with a tapered or circular cross-section for decreasing a generation of turbulent flow while mixing a liquid is arranged on at least one side of an end of the paddle, wherein the square bars are located in a central region of the paddle to reduce vibration in the paddle and provide uniform stirring of the surface treatment solution, and wherein the structure is located in a region of the paddle that is outside of the central region; wherein a shape of the structure is a tapered shape or a circular shape in a cross section in a thickness direction of the structure; wherein each square bar of the plurality of square bars is provided with a curved surface with respect to the substrate in a cross section in a thickness direction of the plurality of square bars , and the curved surface is provided alternately facing left and facing right with respect to the substrate;

wherein each square bar of the plurality of square bars comprises a side of 5 to 10 mm in length; and wherein each square bar of the plurality of square bars includes a curved surface having a radius of 3 to 10 mm.

* * * * *